US012651945B2

(12) United States Patent
Yokouchi et al.

(10) Patent No.: US 12,651,945 B2
(45) Date of Patent: Jun. 9, 2026

(54) ELECTRIC MOTOR

(71) Applicant: Panasonic Intellectual Property Management Co., Ltd., Osaka (JP)

(72) Inventors: Yasuyuki Yokouchi, Osaka (JP); Akihiko Watanabe, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 197 days.

(21) Appl. No.: 18/716,223

(22) PCT Filed: Nov. 2, 2022

(86) PCT No.: PCT/JP2022/041033
§ 371 (c)(1),
(2) Date: Jun. 4, 2024

(87) PCT Pub. No.: WO2023/106006
PCT Pub. Date: Jun. 15, 2023

(65) Prior Publication Data
US 2025/0038626 A1 Jan. 30, 2025

(30) Foreign Application Priority Data

Dec. 9, 2021 (JP) ................................. 2021-200222

(51) Int. Cl.
H02K 11/27 (2016.01)
F16C 19/08 (2006.01)
(Continued)

(52) U.S. Cl.
CPC .............. H02K 11/27 (2016.01); F16C 19/08 (2013.01); H02K 5/1732 (2013.01); H02K 7/083 (2013.01); F16C 2380/26 (2013.01)

(58) Field of Classification Search
CPC ...... H02K 11/27; H02K 5/1732; H02K 7/083; F16C 19/08; F16C 2380/26
See application file for complete search history.

(56) References Cited

U.S. PATENT DOCUMENTS 9,140,758 B2 9/2015 Marinov
2012/0274157 A1 11/2012 Watanabe et al.

FOREIGN PATENT DOCUMENTS

JP 2013-066253 4/2013
JP 2013066253 A * 4/2013 ............... H02K 5/08
(Continued)

OTHER PUBLICATIONS

English translation of JP-2013066253-A. (Year: 2013).*
(Continued)

*Primary Examiner* — Sean Gugger
(74) *Attorney, Agent, or Firm* — Rimon P.C.

(57) ABSTRACT

A discharge phenomenon of a bearing is detected with high accuracy. Electric motor (10) includes stator (11) including stator core (11a) with winding (11b) wound around stator core (11a), rotor (12) facing stator (11) and including rotating body (13) and shaft (14), first and second bearings (15a, 15b) that are a pair of bearings, first and second brackets (19a, 19b) that are a pair of brackets respectively fix outer rings (17) of the pair of bearings, conductor (21), and current detector (22). Each of the pair of bearings includes inner ring (16) and outer ring (17) and supports shaft (14) with inner ring (16). Conductor (21) electrically connects outer ring (17) of first bearing (15A) and outer ring (17) of second bearing (15B) or stator core (11a). Current detector (22) detects a discharge current flowing through conductor (21) accompanying discharge in first bearing (15A) or second bearing (15B).

5 Claims, 4 Drawing Sheets

(51) Int. Cl.
   H02K 5/173          (2006.01)
   H02K 7/08          (2006.01)

(56)                    References Cited

FOREIGN PATENT DOCUMENTS

| JP | 5338641 B | 11/2013 |
| JP | 2016-146691 | 8/2016 |
| JP | 2016146691 A * | 8/2016 |
| JP | 2019-132508 | 8/2019 |

OTHER PUBLICATIONS

English translation of JP-2016146691-A. (Year: 2016).*
International Search Report of PCT application No. PCT/JP2022/041033 dated Jan. 17, 2023.

* cited by examiner

ELECTRIC MOTOR

TECHNICAL FIELD

The present disclosure relates to an electric motor.

BACKGROUND ART

Conventionally, there has been known an electric motor including a stator, a rotor having a shaft, a bearing that supports the shaft, and two brackets that fix the bearing (for example, PTL 1). In the electric motor of PTL 1, the two brackets have conductivity and are electrically connected to each other. A conductive pin is used for this electrical connection.

CITATION LIST

Patent Literature

PTL 1: Japanese Patent No. 5338641

SUMMARY OF THE INVENTION

In an electric motor (in particular, an electric motor driven by an inverter of a pulse width modulation type (PWM type)), discharge may occur inside a bearing. When discharge occurs, electrolytic corrosion occurs inside the bearing due to discharge current. Progress of electrolytic corrosion inside the bearing generates abnormal noise from the bearing. This series of phenomena is one of main factors of the malfunction in the electric motor. Therefore, for example, in order to monitor the progress of electrolytic corrosion, it is desired to accurately detect the discharge phenomenon of the bearing. In such a circumstance, an object of the present disclosure is to provide an electric motor capable of detecting a discharge phenomenon of a bearing with high accuracy.

An electric motor according to one aspect of the present disclosure includes a stator, a rotor, a pair of bearings, a pair of brackets, a conductor, and a current detector. The stator includes a stator core with a winding wound around the stator core. The rotor is disposed facing the stator and includes a rotating body and a shaft. Each of the pair of bearings includes an inner ring and an outer ring and supports the shaft with the inner ring. One of the pair of brackets fixes the outer ring of one of the pair of bearings, and the other of the pair of brackets fixes the outer ring of the other of the pair of bearings. The conductor electrically connects the outer ring of the one of the pair of bearings and the outer ring of the other of the pair of bearings or the stator core. The current detector detects a discharge current flowing through the conductor accompanying discharge in the pair of bearings.

According to the present disclosure, a discharge phenomenon of a bearing can be detected with high accuracy.

DESCRIPTION OF EMBODIMENT

Figure 1:
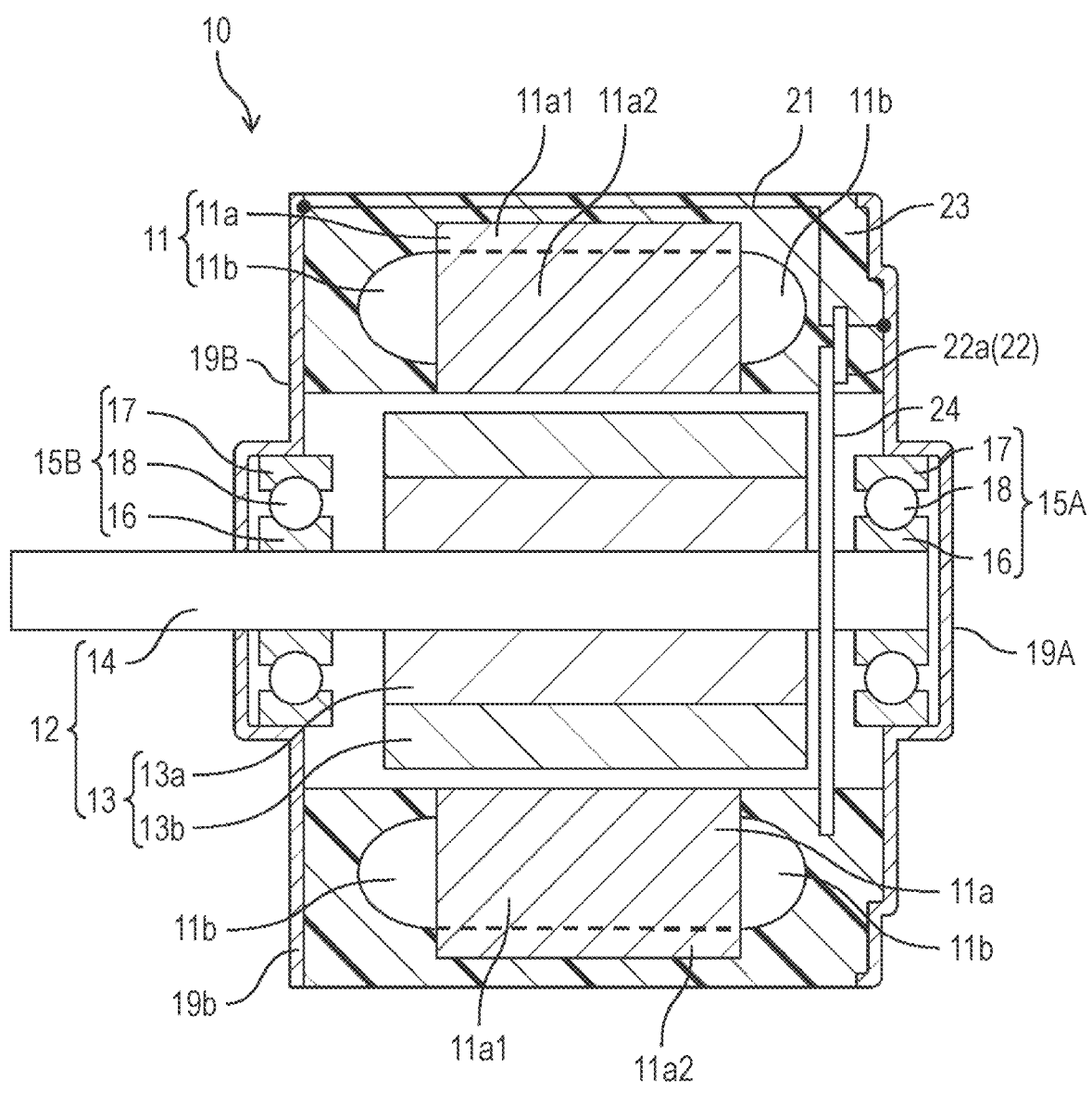
FIG. 1 is a sectional view schematically illustrating an electric motor according to a first exemplary embodiment.

Hereinafter, exemplary embodiments of an electric motor according to the present disclosure will be described with reference to examples. The present disclosure is not limited to examples described below. Although specific numerical values and materials may be provided as some examples in the following description, other numerical values and materials may be used as long as the effect of the present disclosure can be achieved.

An electric motor according to the present disclosure includes a stator, a rotor, a pair of bearings, a pair of brackets, a conductor, and a current detector.

The stator includes a stator core with a winding wound around the stator core. The stator core may be made of a magnetic material such as a stacked steel sheet or a powder magnetic core. The stator core may include a back yoke and a plurality of teeth protruding from the back yoke. The winding may be wound around the teeth of the stator core. The winding type of the winding may be, for example, a concentrated winding type or a distributed winding type.

The rotor is disposed facing the stator. The rotor may face the stator in a radial direction of the electric motor, or may face the stator in an axial direction of the electric motor. The rotor includes a rotating body and a shaft. The rotating body may include a rotating body core made of a magnetic material such as a stacked steel plate or a powder magnetic core. The rotating body may further include at least one permanent magnet fixed to the rotating body core. The rotor may be, for example, a surface magnet type rotor. The shaft may be fixed to the rotating body. The shaft may be made of a magnetic material or a non-magnetic material. The shaft may have conductivity.

Each of the pair of bearings has an inner ring and an outer ring. Each of the pair of bearings supports the shaft with the inner ring. Each of the inner ring and the outer ring may have conductivity. The bearing may further include a conductive rolling element (for example, it is made of metal) provided between the inner ring and the outer ring. The bearing may be any type of rolling bearing. The bearing may be, for example, a radial ball bearing, but is not limited thereto. The pair of bearings may be bearings of the same type or bearings of different types.

The pair of brackets may have conductivity or insulation. The pair of brackets may be made of metal or insulating resin, for example. Outer rings of the pair of bearings are fixed to the pair of brackets. Specifically, the outer ring of one bearing is fixed to one bracket, and the outer ring of the other bearing is fixed to the other bracket. This causes one bracket to be electrically connected to the outer ring of one bearing and the other bracket to be electrically connected to the outer ring of the other bearing when each bracket has conductivity.

The conductor electrically connects the outer ring of one bearing and the outer ring of the other bearing or the stator core. The conductor may be made of, for example, metal. The conductor may be formed of a single component or a plurality of components. The conductor may include, for example, a lead wire or a conductive tape. In such a conductor, a pulsed discharge current flows when discharge occurs in the bearing. The discharge current flowing through the conductor is equivalent to the discharge current flowing between the outer ring and the inner ring inside the bearing.

The current detector detects the discharge current flowing through the conductor accompanying the discharge in the bearing. That is, the current detector directly detects the discharge current flowing between the outer ring and the inner ring inside the bearing. Thus, the discharge phenomenon of the bearing can be detected with high accuracy as compared with a case where the discharge current is indirectly detected by some means. Based on the highly accurate detection result of the discharge phenomenon, it is possible to monitor the progress of electrolytic corrosion inside the bearing. In addition, since the current detector detects the current flowing through the conductor that is a fixing member, it is not necessary to include a mechanical element that comes into contact with a movable part such as a shaft. Thus, a maintenance-free and highly reliable current detector can be easily realized.

The electric motor may further include a first identification unit that identifies the magnitude of the discharge current based on the detection value of the current detector. The first identification unit may determine that the discharge current is larger when the absolute value of the detection value is larger. Here, the larger discharge current, the larger the degree of progress of electrolytic corrosion inside the bearing due to the discharge. Thus, identifying the magnitude of the discharge current makes it possible to monitor the progress of electrolytic corrosion inside the bearing in more detail.

The electric motor may further include a second identification unit that identifies the direction of the discharge current based on the detection value of the current detector. The second identification unit may identify the direction of the discharge current according to the positive or negative of the detection value. Here, the degree of progress of electrolytic corrosion inside the bearing due to discharge varies depending on the direction of the discharge current. Thus, identifying the direction of the discharge current makes it possible to monitor the progress of electrolytic corrosion inside the bearing in more detail.

The electric motor may further include a counter that counts the number of times of detection of the discharge current based on the detection value of the current detector. The counter may increase the number of times of detection by one every time the absolute value of the detection value exceeds a predetermined threshold. Here, as the discharge current flows more, the electrolytic corrosion inside the bearing progresses. Thus, counting the number of times of detection of the discharge current makes it possible to monitor the progress of electrolytic corrosion inside the bearing in more detail.

The electric motor may further include a notification unit that notifies the outside when the number of times of detection counted by the counter exceeds a first threshold. According to this configuration, for example, when the degree of progress of electrolytic corrosion is likely to exceed an allowable degree (that is, when maintenance or the like of the electric motor is required), the fact can be notified to the outside. Upon receiving the notification from the notification unit, the user can perform maintenance of the electric motor at an appropriate timing.

The electric motor may further include a counter that counts the number of times of detection of the discharge current based on the detection value of the current detector, and integrates a product (w·C) of a coefficient w (for example, a numerical value of from 1 to 10, inclusive) having a magnitude proportional to the magnitude of the discharge current and a predetermined constant C (for example, 1) when counting the number of times of detection of the discharge current. Such a counting method makes it possible to monitor the progress of electrolytic corrosion inside the bearing in more detail in consideration of both the magnitude of the discharge current and the number of times of detection.

The electric motor may further include a notification unit that notifies the outside when the integrated value integrated by the counter exceeds a second threshold. According to this configuration, for example, when the degree of progress of electrolytic corrosion is likely to exceed an allowable degree (that is, when maintenance or the like of the electric motor is required), the fact can be notified to the outside. Upon receiving the notification from the notification unit, the user can perform maintenance of the electric motor at an appropriate timing.

The current detector may include a current sensor that detects a current flowing through the conductor. This configuration makes it possible to suppress erroneous detection of the discharge current due to noise or the like. The current sensor may be a current sensor of a current transformer type (CT type for short).

The current detector may include a shunt resistor for detecting a current flowing through the conductor. This configuration makes it possible to suppress erroneous detection of the discharge current due to noise or the like.

The stator may be molded with an insulating resin. At least a part of the conductor may be disposed inside the insulating resin. This configuration makes it possible to firmly fix the conductor with the insulating resin (mold resin). The insulating resin may include, for example, an epoxy resin.

The stator may be molded with an insulating resin. The conductor and the current detector may be disposed outside the insulating resin. This configuration makes it possible to easily apply the components necessary for the technology of the present disclosure, that is, the conductor and the current detector to an existing electric motor.

The pair of brackets may have conductivity. One end of the conductor may be connected to one bracket. The other end of the conductor may be connected to the other bracket. Alternatively, the other end of the conductor may be connected to the stator core. Alternatively, the other end of the conductor may be connected to an outer ring of the bearing fixed to the other bracket.

One end of the conductor may be connected to the outer ring of one bearing. The other end of the conductor may be connected to the outer ring of the other bearing. Alternatively, the other end of the conductor may be connected to the stator core.

In this manner, according to the present disclosure, the discharge phenomenon of the bearing can be detected with high accuracy by directly detecting the discharge current generated in the bearing. In addition, according to the present disclosure, the progress of electrolytic corrosion inside the bearing can be monitored based on such a detection result. Further, according to the present disclosure, a maintenance-free and highly reliable current detector can be easily realized.

Hereinafter, an example of the electric motor according to the present disclosure will be specifically described with reference to the drawings. The above-described components can be applied to components of an electric motor as an example to be described below. The components of the electric motor as the example to be described below can be changed based on the above-described description. In addition, matters to be described below may be applied to the exemplary embodiment described above. Among the components of the electric motor as an example to be described below, components that are not essential to the electric motor according to the present disclosure may be omitted. The following drawings are schematic and do not accurately reflect the shape and number of actual members.

First Exemplary Embodiment

Figure 2:
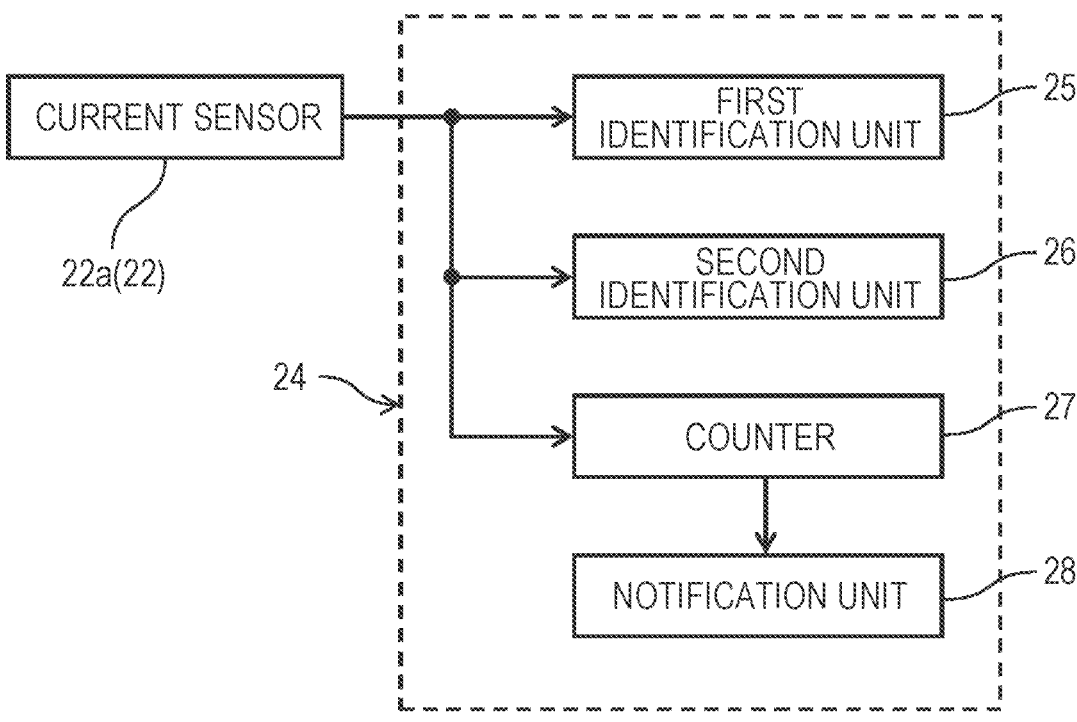
FIG. 2 is a block diagram illustrating a configuration of a control board (controller) and the like in the first exemplary embodiment.

A first exemplary embodiment of the present disclosure will be described. FIG. 1 is a sectional view schematically illustrating electric motor 10 according to the first exemplary embodiment. FIG. 2 is a block diagram illustrating a configuration of a control board (controller) and the like in electric motor 10 according to the first exemplary embodiment. Although electric motor 10 of the present exemplary embodiment is a radial gap type electric motor, the technology of the present disclosure is also applicable to an axial gap type electric motor. Although electric motor 10 of the present exemplary embodiment is an inner rotor type electric motor, the technology of the present disclosure is also applicable to an outer rotor type electric motor. Electric motor 10 may be, for example, a concentrated winding type three-phase synchronous motor, but is not limited thereto.

As illustrated in FIGS. 1 and 2, electric motor 10 includes stator 11, rotor 12, first bearing 15A and second bearing 15B constituting a pair of bearings, first bracket 19A and second bracket 19B constituting a pair of brackets, conductor 21, current detector 22, insulating resin 23, and control board 24.

Stator 11 includes stator core 11a with winding 11b wound around the stator core. Stator core 11a is made of a stacked steel plate. Stator core 11a has a substantially cylindrical shape as a whole. Stator core 11a includes a back yoke 11a1 and a plurality of teeth 11a2 protruding radially inward from back yoke 11a1. Winding 11b is wound around teeth 11a2 of stator core 11a in a concentrated winding type.

Rotor 12 is disposed facing stator 11. Rotor 12 faces stator 11 in a radial direction of electric motor 10. Rotor 12 is disposed inside stator 11. Rotor 12 includes rotating body 13 having a substantially cylindrical shape and shaft 14 fixed to the rotating body. Rotating body 13 includes rotating body core 13a made of a stacked steel plate and a plurality of permanent magnets 13b fixed to rotating body core 13a. Shaft 14 is made of a conductive non-magnetic material.

Each of first bearing 15A and second bearing 15B includes inner ring 16, outer ring 17, and a plurality of rolling elements 18 provided between the inner and outer rings. Each of first bearing 15A and second bearing 15B rotatably supports shaft 14 with inner ring 16. Inner ring 16, outer ring 17, and rolling elements 18 each have conductivity. Both first bearing 15A and second bearing 15B are radial ball bearings.

First bracket 19A and second bracket 19B constituting the pair of brackets are each made of conductive metal. Outer ring 17 of first bearing 15A, which is one bearing, is fixed to first bracket 19A, which is one bracket. This causes first bracket 19A to be electrically connected to outer ring 17 of first bearing 15A. Outer ring 17 of second bearing 15B, which is the other bearing, is fixed to second bracket 19B, which is the other bracket. This causes second bracket 19B to be electrically connected to outer ring 17 of second bearing 15B.

Conductor 21 is formed of a metal lead wire. Conductor 21 electrically connects outer ring 17 of first bearing 15A and outer ring 17 of second bearing 15B. Specifically, one end of conductor 21 is connected to first bracket 19A, and the other end of conductor 21 is connected to second bracket 19B. Conductor 21 thus realizes the electrical connection. A pulsed discharge current flows through conductor 21 when discharge occurs in first bearing 15A or second bearing 15B. This discharge current is equivalent to a discharge current flowing between outer ring 17 and inner ring 16 inside first bearing 15A and second bearing 15B.

Current detector 22 detects a discharge current flowing through conductor 21 accompanying the discharge in first bearing 15A or second bearing 15B. That is, current detector 22 directly detects the discharge current flowing between outer ring 17 and inner ring 16 inside first bearing 15A and second bearing 15B. Current detector 22 includes current sensor 22a that detects a current flowing through conductor 21. Current sensor 22a is a current sensor of a CT type, and is fixed to control board 24. The detection value of current detector 22 is input to an arithmetic device (described later) of control board 24 via an amplifier as necessary.

Insulating resin 23 molds stator 11. Insulating resin 23 fixes second bracket 19B. First bracket 19A is fixed to insulating resin 23 by press fitting, for example. At least a part (for example, all) of conductor 21 is disposed inside insulating resin 23.

Control board 24 includes an arithmetic device and a storage device in which a program executable by the arithmetic device is stored. The arithmetic device functions as each functional block by executing the program. As illustrated in FIG. 2, such a functional block includes first identification unit 25, second identification unit 26, counter 27, and notification unit 28. Control board 24 is an example of a controller.

First identification unit 25 identifies the magnitude of the discharge current based on the detection value of current detector 22. First identification unit 25 determines that the larger the absolute value of the detection value, the larger the discharge current.

Second identification unit 26 identifies the direction of the discharge current based on the detection value of current detector 22. Second identification unit 26 identifies the direction of the discharge current according to the positive or negative of the detection value.

Counter 27 counts the number of times of detection of the discharge current based on the detection value of current detector 22. Counter 27 increases the number of times of detection by one every time the absolute value of the detection value exceeds a predetermined threshold.

When the number of times of detection counted by counter 27 exceeds a first threshold, notification unit 28 notifies the outside of the fact. For example, notification unit 28 may notify the outside that the number of times of detection exceeds the first threshold by outputting a predetermined signal for operating an external device (for example, an output monitor).

When counter 27 counts the number of times of detection of the discharge current based on the detection value of current detector 22, counter 27 may integrate product w·C of coefficient w having a magnitude proportional to the magnitude of the discharge current and predetermined constant C. In this case, when the integrated value integrated by counter 27 exceeds a second threshold, notification unit 28 may notify the outside of the fact. Here, the second threshold may be the same as or different from the first threshold.

Second Exemplary Embodiment

Figure 3:
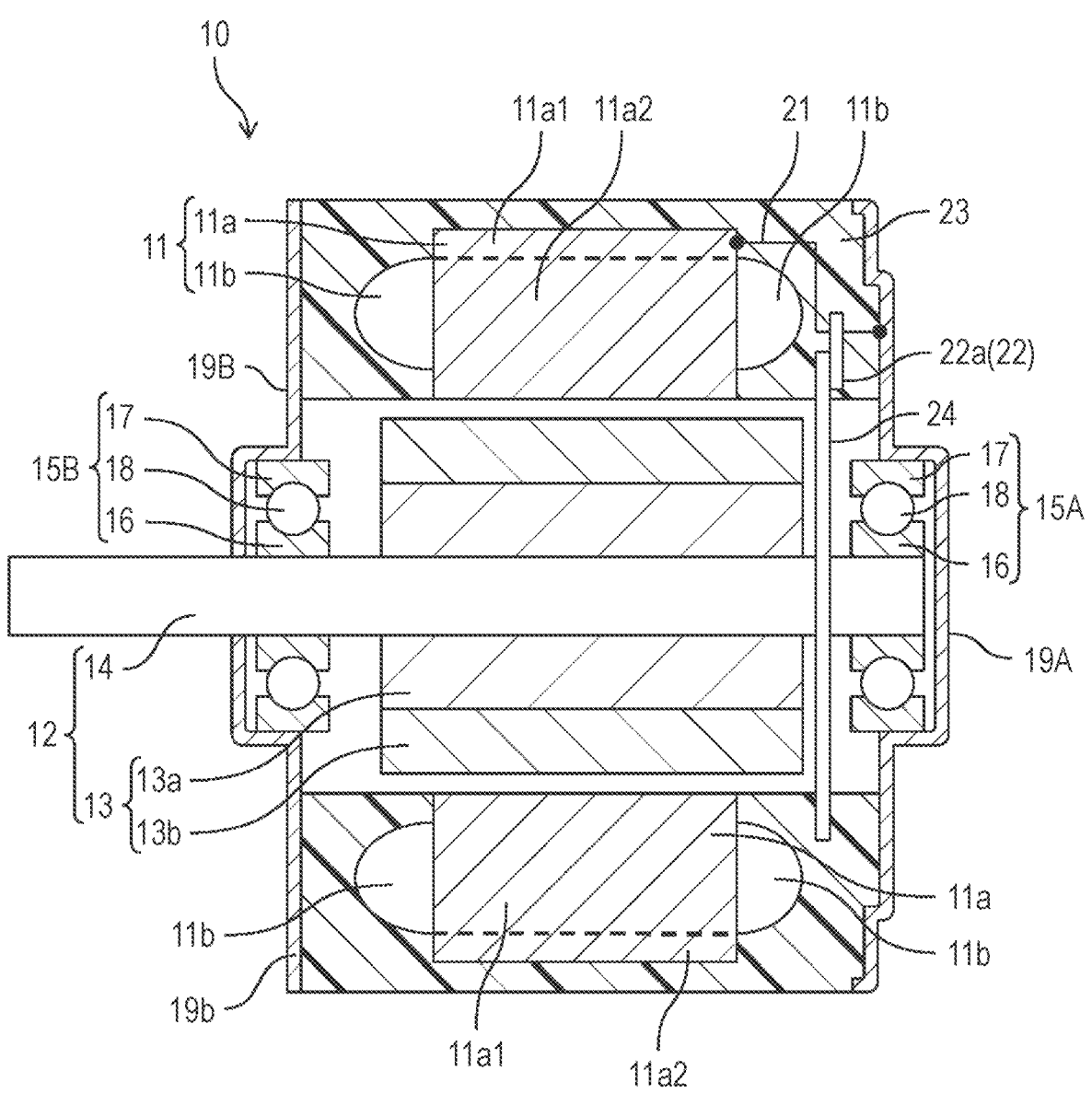
FIG. 3 is a sectional view schematically illustrating an electric motor according to a second exemplary embodiment.

A second exemplary embodiment of the present disclosure will be described. FIG. 3 is a sectional view schematically illustrating electric motor 10 according to the second exemplary embodiment. Electric motor 10 of the present exemplary embodiment is different from that of the first exemplary embodiment in the configuration of conductor 21. Hereinafter, differences from the first exemplary embodiment will be mainly described.

As illustrated in FIG. 3, one end of conductor 21 is connected to first bracket 19A, and the other end of conductor 21 is connected to stator core 11*a*. Conductor 21 thus realizes electrical connection between outer ring 17 of first bearing 15A and stator core 11*a*. In this configuration, a discharge current flows through conductor 21 accompanying the discharge in first bearing 15A. The discharge current is directly detected by current detector 22.

Third Exemplary Embodiment

Figure 4:
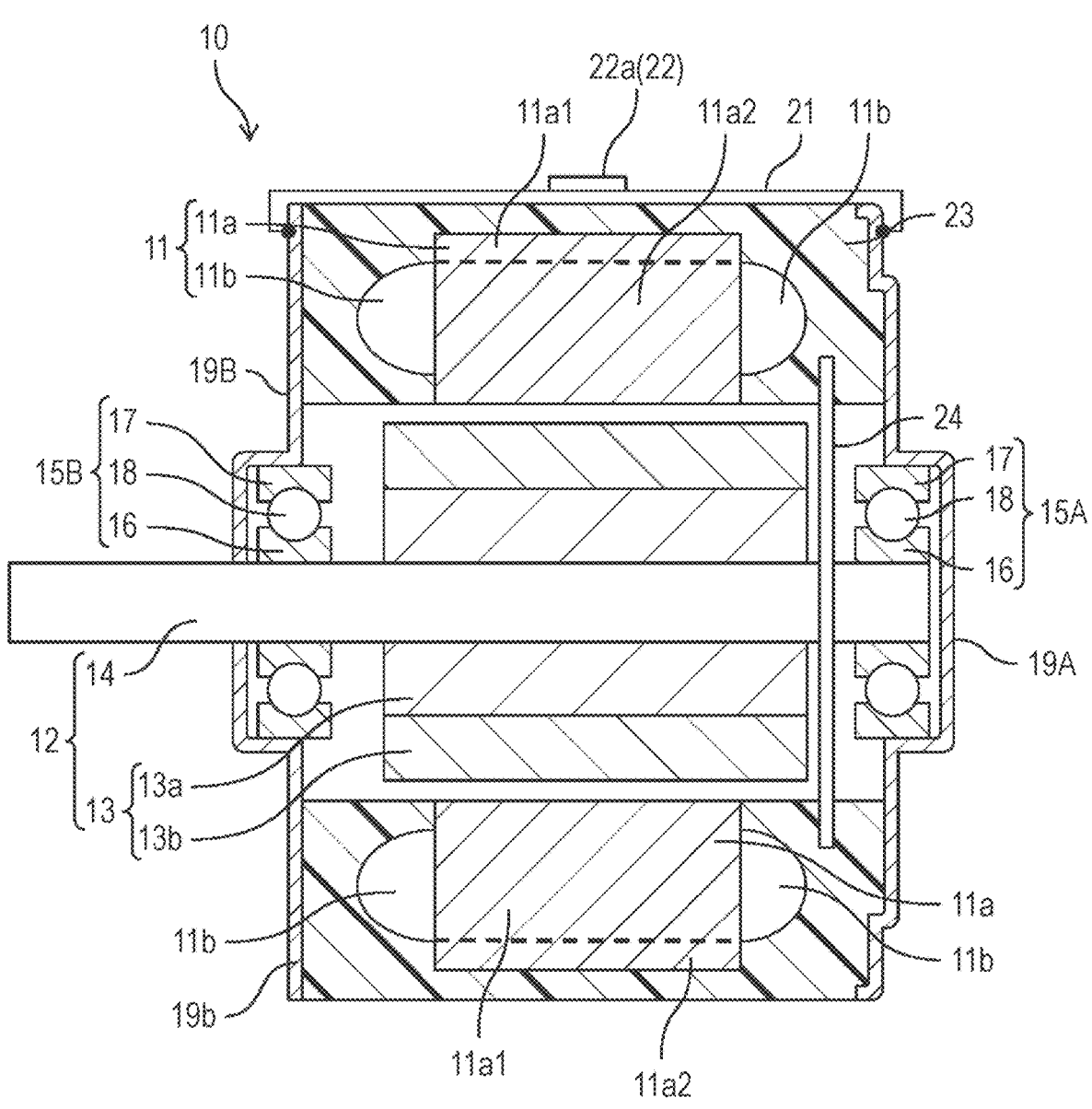
FIG. 4 is a sectional view schematically illustrating an electric motor according to a third exemplary embodiment.

A third exemplary embodiment of the present disclosure will be described. FIG. 4 is a sectional view schematically illustrating electric motor 10 according to the third exemplary embodiment. Electric motor 10 of the present exemplary embodiment is different from that of the first exemplary embodiment in the disposition of conductor 21 and current detector 22. Hereinafter, differences from the first exemplary embodiment will be mainly described.

As illustrated in FIG. 4, conductor 21 and current detector 22 are disposed outside insulating resin 23. One end of conductor 21 is connected to first bracket 19A, and the other end of conductor 21 is connected to second bracket 19B. Conductor 21 thus realizes electrical connection between outer ring 17 of first bearing 15A and outer ring 17 of second bearing 15B. In this configuration, a discharge current flows through conductor 21 accompanying the discharge in first bearing 15A or second bearing 15B. The discharge current is directly detected by current detector 22.

INDUSTRIAL APPLICABILITY

The present disclosure is applicable to an electric motor.

The invention claimed is:

1. An electric motor comprising:

a stator including a stator core with a winding wound around the stator core;

a rotor facing the stator and including a rotating body and a shaft;

a pair of bearings each including an inner ring and an outer ring and supporting the shaft with the inner ring;

a pair of brackets, one of the pair of brackets fixing the outer ring of one of the pair of bearings and another of the pair of brackets fixing the outer ring of another of the pair of bearings;

a conductor that electrically connects the outer ring of the one of the pair of bearings and the outer ring of the other of the pair of bearings or the stator core;

a current detector that detects a discharge current flowing through the conductor accompanying discharge in the pair of bearings; and

a second identification unit that identifies a direction of the discharge current based on a detection value of the current detector.

2. An electric motor comprising:

a stator including a stator core with a winding wound around the stator core;

a rotor facing the stator and including a rotating body and a shaft;

a pair of bearings each including an inner ring and an outer ring and supporting the shaft with the inner ring;

a pair of brackets, one of the pair of brackets fixing the outer ring of one of the pair of bearings and another of the pair of brackets fixing the outer ring of another of the pair of bearings;

a conductor that electrically connects the outer ring of the one of the pair of bearings and the outer ring of the other of the pair of bearings or the stator core;

a current detector that detects a discharge current flowing through the conductor accompanying discharge in the pair of bearings; and a counter that counts a number of times of detection of the discharge current based on a detection value of the current detector.

3. The electric motor according to claim 2, further comprising a notification unit that notifies an outside when the number of times of detection counted by the counter exceeds a first threshold.

4. An electric motor comprising:

a stator including a stator core with a winding wound around the stator core;

a rotor facing the stator and including a rotating body and a shaft;

a pair of bearings each including an inner ring and an outer ring and supporting the shaft with the inner ring;

a pair of brackets, one of the pair of brackets fixing the outer ring of one of the pair of bearings and another of the pair of brackets fixing the outer ring of another of the pair of bearings;

a conductor that electrically connects the outer ring of the one of the pair of bearings and the outer ring of the other of the pair of bearings or the stator core;

a current detector that detects a discharge current flowing through the conductor accompanying discharge in the pair of bearings; and a counter that counts a number of times of detection of the discharge current based on a detection value of the current detector, the counter integrating a product of a coefficient having a magnitude proportional to a magnitude of the discharge current and a predetermined constant when counting the number of times of detection.

5. The electric motor according to claim 4, further comprising a notification unit that notifies an outside when an integrated value integrated by the counter exceeds a second threshold.

* * * * *